Oct. 9, 1934.  C. R. BOOTHBY ET AL  1,976,598
INDUCTION MOTOR
Filed Sept. 10, 1932
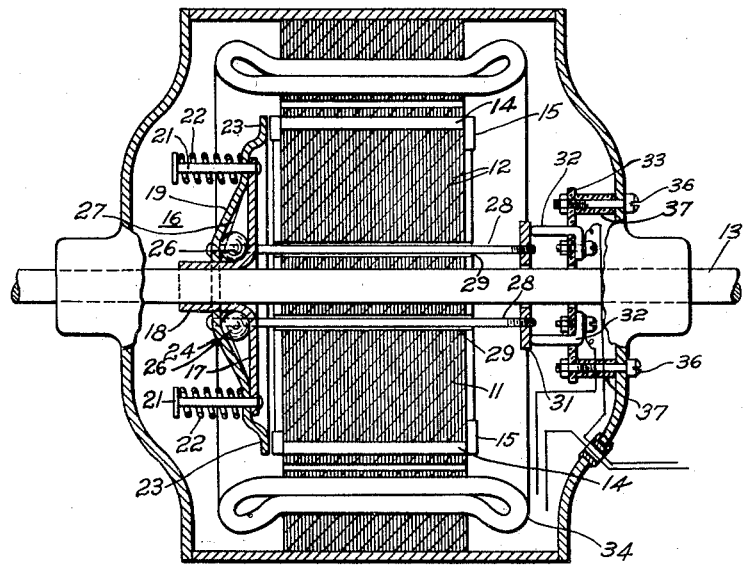
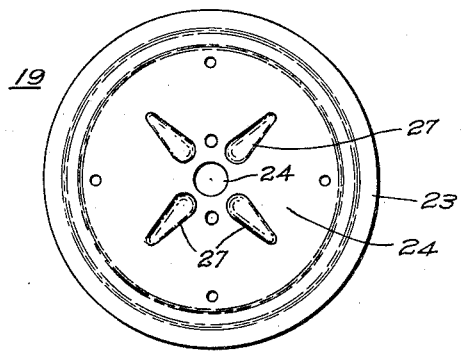
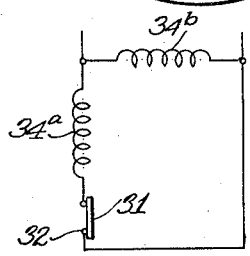
WITNESSES:
INVENTORS.
Clinton R. Boothby &
Harry D. Else.
BY
ATTORNEY Patented Oct. 9, 1934

1,976,598

UNITED STATES PATENT OFFICE

1,976,598
INDUCTION MOTOR

Clinton R. Boothby and Harry D. Else, Springfield, Mass., assignors to Westinghouse Electric & Manufacturing Company, East Pittsburgh, Pa., a corporation of Pennsylvania Application September 10, 1932, Serial No. 632,502

3 Claims. (Cl. 172—278)

Our invention relates to a starting device for induction motors, more particularly of the single phase type, and it has particular relation to automatic means for varying the reactance of the rotor.

In starting induction motors, a low current in the rotor is desirable. This is especially true of single-phase induction motors. Considerable difficulty has been experienced in trying to control the starting current in the squirrel-cage type of rotor.

It is, accordingly, an object of our invention to provide a novel means for varying the reactance in the rotor of an induction motor of the squirrel-cage type during the starting operation and which may also automatically operate a switch for opening the starting winding of the motor.

Another object of our invention is to provide an efficient and economical means for bringing an induction motor up to speed and interrupting the circuit of the starting winding.

Another object of our invention is to provide a centrifugally operated device which effects a high reactance in the rotor upon starting and which decreases the reactance upon increase in the speed of the rotor.

Another object of our invention is to provide a higher maximum running torque for a given starting current in an induction motor.

Other objects of our invention will become evident from the following detailed description taken in conjunction with the accompanying drawing, in which—

Figure 1 is a longitudinal sectional view of an induction motor provided with a centrifugally operated device in accordance with our invention;

Fig. 2 is an elevational view of a disc member, and

Fig. 3 is a diagram of connections of the stator winding of the motor.

The apparatus shown in Fig. 1 comprises a rotor 11 of an induction motor of the squirrel-cage type. The rotor comprises laminations 12 mounted on a shaft 13, the rotor having conductor bars 14 disposed near the periphery thereof parallel to the axis of the rotor, and the usual end rings 15.

Our automatic reactance and circuit-controlling switch 16 is mounted on shaft 13 and comprises a disc 17 having a flanged hub 18 fixedly mounted on the shaft, and a movable disc 19 of magnetic material disposed around the flanged hub 18. The movable disc 19 extends substantially parallel to the disc 17 and is mounted thereon by a plurality of bolts 21 rigidly secured to the disc 17 near its periphery. The movable disc 19 rotates with the disc 17 but is adapted to move laterally therefrom. By the provision of helical springs 22 surrounding the shanks of bolts 21, the movable disc 19 is normally forced into engagement with the disc 17.

Movable disc 19 has its outer peripheral portion 23 offset toward the conductor bars 14 so that the air gap between the portion 23 and the end ring 15 will be as small as possible. The inner portion 24 of movable disc 19 is offset opposite to the outer portion 23 in order that centrifugally actuable weights or balls 26 may be disposed between the discs 17 and 19. The movable disc 19 has radial depressions 27, of decreasing width toward the outer portion thereof, for guiding the balls 26 in their outward movement. The inner end of the offset portion 24 near the hub 18 is offset enough to allow the balls 26 to rest between the members 17 and 19 when they are in engagement in their normal inoperative position. The spaces 27 between the members 17 and 19 decrease in width toward the outer peripheries so that when the balls 26 move outwardly because of centrifugal force, the movable member 19 will be forced laterally away from the member 17 against the force of the springs 22.

Suitable axially extending rods 28 are secured to the movable member 19 and move longitudinally therewith. The rods 28 extend through suitable apertures 29 in the rotor and have a contact plate 31 secured to the opposite end thereof. Stationary brush members 32 mounted on a suitable insulating plate 33, may be associated with a starting winding 34a, constituting a part of the stator winding 34 and shown schematically in Fig. 3, for opening the starting winding when the rotor reaches a predetermined speed. The main winding is indicated at 34b. The plate 33 may be supported by means of bolts 36 from one of the bearing brackets of the motor, sleeves 37 on the bolts serving to space the plate from the bearing bracket.

In operation, the movable disc 19, being of magnetic material and close to one of the end rings 15, causes a high reactance in the secondary circuit which lowers the starting current. At some predetermined speed as the motor accelerates, which speed may be the operating speed of the starting switch, the balls 26 move radially outwardly in the radial grooves 27 and in turn move the disc 19 longitudinally against the force of the springs 22 away from the rotor and the end ring 15. As the disc 19 moves away from the end ring, the reactance in the rotor decreases.

This device gives a higher maximum running torque for a given starting current because the additional reactance which reduces the starting current is not effective when the motor is running. The balls will resume their normal inoperative position and the disc 19 will move to its original inoperative position upon the stopping of the motor, because of the force of the springs 22.

The contact plate 31 moves with the movable disc 19 and thereby moves away from the brush members 32 and breaks the starting winding circuit at a predetermined speed.

The device embodying our invention thus provides an efficient means for decreasing the current in an induction motor upon starting and for interrupting the circuit of the starting winding at a predetermined speed.

While we have disclosed a preferred form of our invention for the purpose of illustration, it is to be understood that various modifications are contemplated within the scope of the claims which follow.

We claim as our invention:

1. An alternating current motor including a starting winding and a squirrel cage rotor, an axially movable magnetizable plate at one end of the rotor, spring means for yieldingly pressing the magnetizable plate toward the rotor, circuit controlling means for the starting winding, and a centrifugally actuable device operatively associated with the rotor for simultaneously moving the plate away from the rotor and actuating the circuit controlling means to interrupt the circuit of the starting winding.

2. In an induction motor, in combination, a secondary winding, a starting winding, a centrifugally-operated device for controlling the reactance in said secondary winding and for open-circuiting said starting winding at a predetermined speed, said device comprising two discs, one of said discs being adapted to control the reactance of said secondary winding upon starting and being also adapted to cause open-circuiting of said starting winding at a predetermined speed, and a plurality of balls disposed between said discs for moving one of said discs laterally when said motor is operated.

3. An alternating-current motor including a squirrel-cage rotor having end rings thereon, a rotor shaft, a disc fixed on the shaft adjacent one end of the rotor, a magnetizable disc at said one end of the rotor movable axially of the shaft, resilient means operatively engaging both discs for pressing the magnetizable disc toward the fixed disc and close to one end ring, and centrifugally-actuable radially movable balls between the discs to move the magnetizable disc away from the end ring at a predetermined rotor speed.

CLINTON R. BOOTHBY.
HARRY D. ELSE.